Aug. 4, 1936.  E. L. THEARLE  2,050,073

APPARATUS FOR DYNAMICALLY BALANCING ROTATABLE BODIES

Original Filed Feb. 15, 1933  2 Sheets-Sheet 1

Inventor:
Ernest L. Thearle,
by Harry E. Dunham
His Attorney.

Aug. 4, 1936.  E. L. THEARLE  2,050,073
APPARATUS FOR DYNAMICALLY BALANCING ROTATABLE BODIES
Original Filed Feb. 15, 1933   2 Sheets-Sheet 2
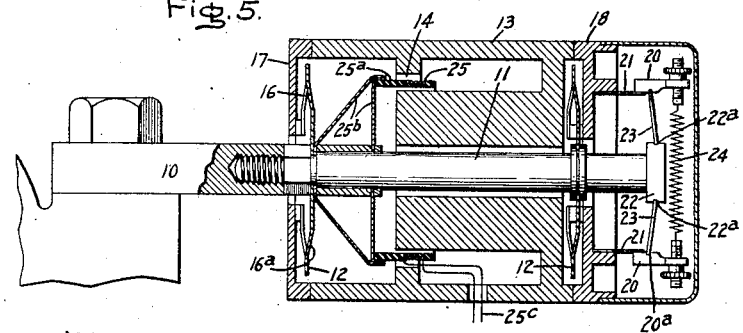
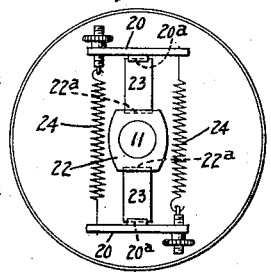
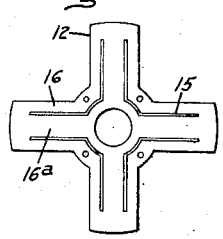
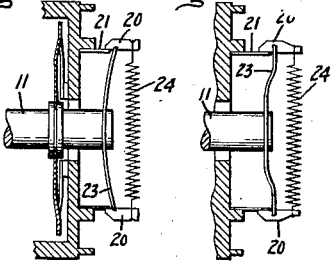
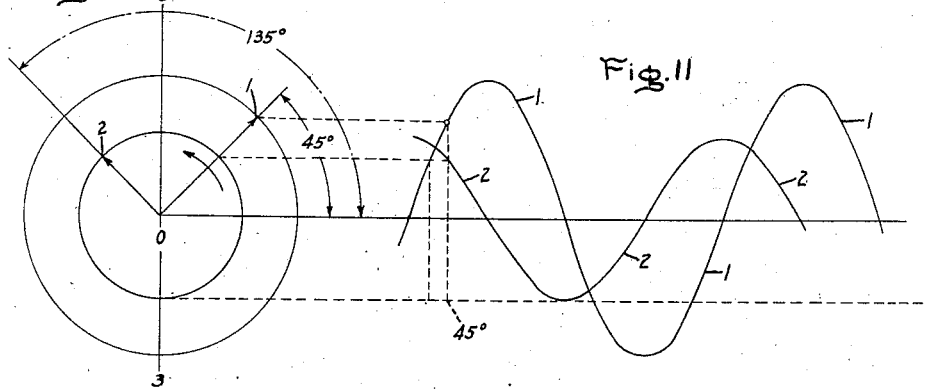
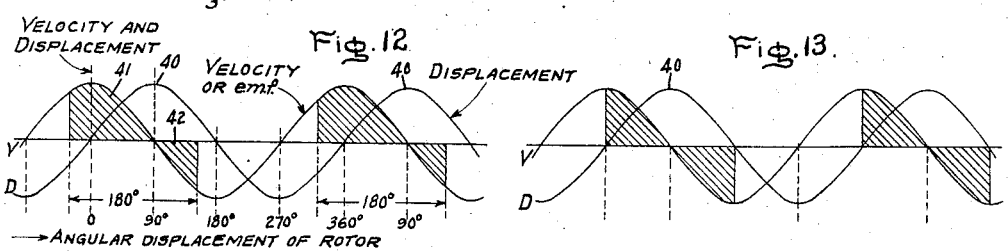
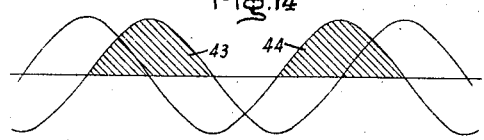
Inventor:
Ernest L. Thearle,
by Harry E. Dunham
His Attorney.

Patented Aug. 4, 1936

2,050,073

UNITED STATES PATENT OFFICE 2,050,073

APPARATUS FOR DYNAMICALLY BALANCING ROTATABLE BODIES

Ernest L. Thearle, Schenectady, N. Y., assignor to General Electric Company, a corporation of New York Original application February 15, 1933, Serial No. 656,878. Divided and this application September 1, 1934, Serial No. 742,417

4 Claims. (Cl. 73—51)

The present application is a division of my prior application for patent, Serial No. 656,878, filed February 15, 1933.

The present invention relates to the dynamic balancing of rotatable bodies, and has for an object the provision of simple apparatus whereby the amount of unbalance of a rotating body and its location may be quickly and accurately determined.

A further and more specific object of the invention comprises the provision in apparatus of the above class of a circuit interrupting or controlling device which is capable of effecting positive closure of a low potential circuit during accurately determinable intervals of time.

For a consideration of what I believe to be novel and my invention, attention is directed to the accompanying description and the claims appended thereto.

Figure 1:
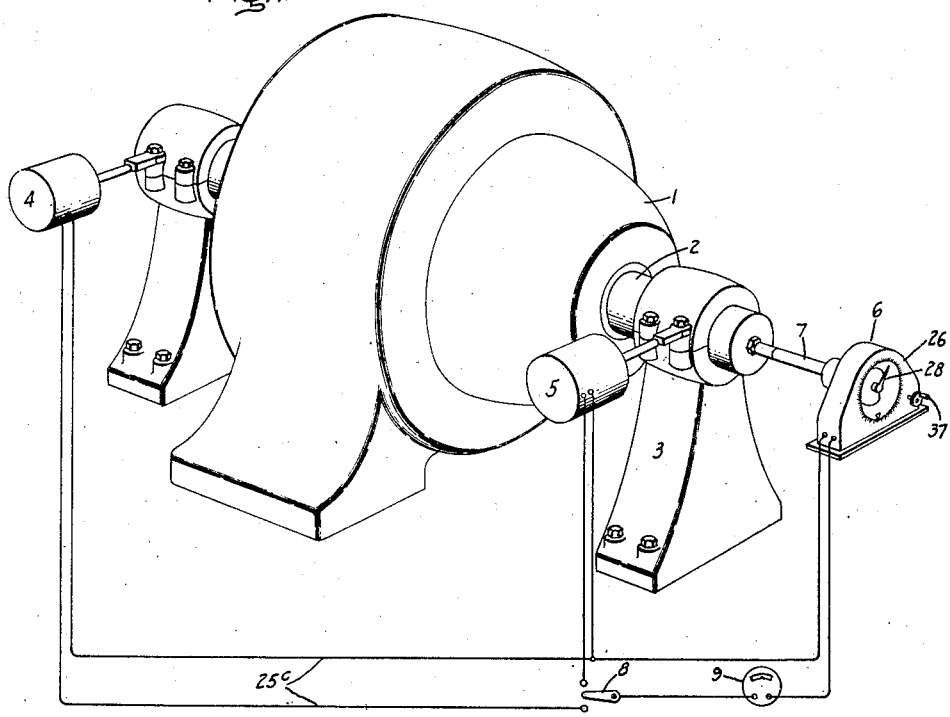
Figure 3:
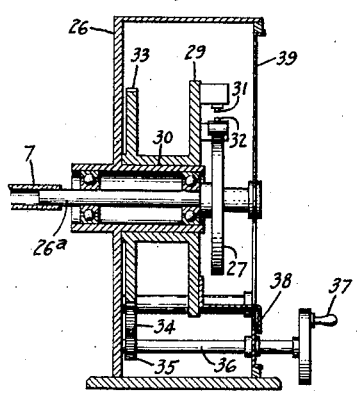
Figure 2:
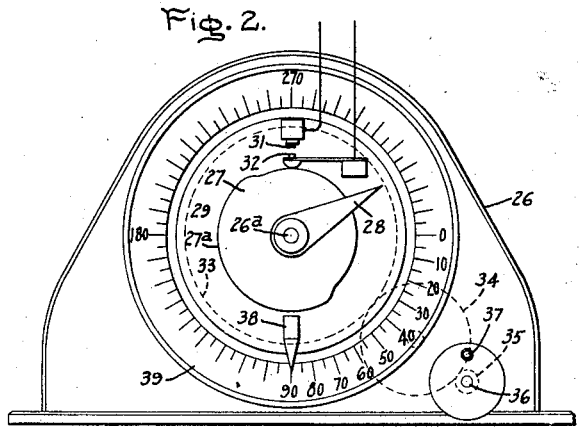
Figure 4:
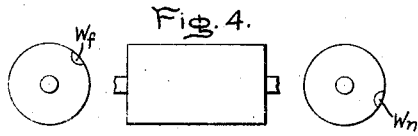

In the attached drawings which are illustrative of my invention, Fig. 1 is a diagrammatic illustration of the application of my improved apparatus to a machine for balancing its rotor; Fig. 2 is a front view of the contact device or mechanism; Fig. 3 is a vertical section of said mechanism; Fig. 4 is a diagram; Fig. 5 is a longitudinal section of one of the generators; Fig. 6 is an end view of the generator; Fig. 7 is a view in front elevation of one of the springs used in the generator; Figs. 8 and 9 illustrate modified forms of the spring means of Fig. 6 and in different operative positions, and Figs. 10 to 14 are diagrams or curves illustrating the theory of the balancing operations.

In connection with Fig. 1, I have illustrated in the interest of simplicity an electric motor 1, having a rotor enclosed in a field frame as usual, and mounted on a shaft 2 carried by bearing supporting pedestals 3. The machine frame and pedestals may have a common foundation. Mounted on two of the pedestals, any two will do if there are more than two, are small electric generators 4 and 5. Two generators are employed because it simplifies the balancing operations, but it is to be understood that a single generator may be used and shifted from one pedestal to the other. This will reduce the cost of the apparatus initially, but such saving is largely or wholly offset by the cost of labor necessitated by shifting a generator back and forth, properly aligning it, etc. 6 indicates a contact mechanism or device mounted on a suitable support, temporary or otherwise, at one end of the machine and is driven by a flexible shaft 7 from the main shaft 2 of said machine. The use of a flexible driving shaft 7 avoids the necessity of accurate axial alignment of the rotor of the motor and the contact device; also it results in a simple form of drive and one that can readily be applied and removed. The generators 4 and 5 are electrically connected to the contact device subject to the control of a manually actuated switch 8. In circuit with one of the wires leading from the generators to the contact device is a sensitive, portable galvanometer 9 which is calibrated in terms of movements of the pedestals due to vibration thereof.

The generator construction, which is more fully disclosed and claimed in my copending application, Serial No. 76,795, filed April 28, 1936, and assigned to the General Electric Company, is illustrated in Figs. 5 to 9. In Fig. 5, 10 indicates a bracket which is rigidly bolted to a bearing pedestal, and secured thereto, as by a screw thread, is a small round rod or tube 11. Mounted on the rod in spaced relation are two springs 12 which are shown in front elevation in Fig. 7. These springs support the permanent field magnet 13 which is of annular form and comparatively massive and comprises an outer and an inner part with an annular air gap 14 between the poles thus formed. As it is desired to maintain the field magnet in concentric relation to the axis of the rod 11, the springs are arranged to be quite rigid against any radial movement of the field magnet but are quite elastic in the axial direction. This is due to the fact that relative axial movements of the permanent magnet field and the armature are employed to generate an electrical current, the magnet remaining practically stationary while the armature vibrates to and fro. As shown, each spring which acts after the fashion of a diaphragm has four arms, and by means of slits 15 are divided into two parts 16 and 16ª. The part 16 is secured to the end head 17 of the magnet which is made of non-magnetic material. The part 16ª is secured to the rod 11. The right hand spring is similarly constructed, one part being secured to the non-magnetic end head 18 and the other part to the rod 11. By this arrangement, the field magnet and its armature to be described later can vibrate freely back and forth axially with respect to each other in response to vibrations of the bearing pedestal but the field magnet and armature are restrained against radial movements. In other words, the rigid mounting of the field magnet results in a high natural frequency of vibration in a radial direction and a very low natural frequency of vibration in the axial direction. So supported, a mass such as the field magnet will remain practically stationary in space as the rod 11 and the armature carried thereby vibrate in an axial direction occasioned by vibrations of the pedestal.

It is evident that if the springs are to be quite stiff in a radial direction, they must also have some stiffness axially or some resistance to axial deflections. This results in a natural resonant frequency of axial vibration of the instrument which destroys or tends to destroy its usefulness at low balancing speeds. To avoid this difficulty, means are provided to completely or partially balance the axial stiffness of the springs, said means acting as if it were a negative spring. That is to say the means exerts a force proportional to the displacement of the field magnet and is in the same direction as the displacement. Such a means is shown in Figs. 5 and 6. Two blocks 20 have opposed V-shaped notches 20ª are secured by thin flat elastic strips or springs 21 to the field structure of the generator. Mounted on the rod or tube 11 is a block 22 which has a pair of V-shaped notches 22ª in its opposite faces. Situated between the blocks are stiff struts 23 having ground knife edges at their ends which are seated in the V-shaped notches. The outer blocks 20 are pulled toward each other by adjustable tension springs 24 of which two are provided. If the field magnet is displaced to the right relative to the rod 11, for example, the struts 23 will tilt in such a direction that they exert components of force on the field structure tending to displace it still farther in the same direction. This action is just the opposite of that of the ordinary spring, and by means of the nuts at the ends, the tension of the springs 24 can be so adjusted as to just balance the positive stiffness of the field supporting springs 12. By this arrangement, the natural frequency of axial vibration of the generator may be made as low as desired.

In Figs. 8 and 9 is illustrated a modified form of the spring compensating means in two of its positions. In this form, the struts 23 are elastic and are secured to the central block or member 22 on the rod 11. Their outer ends may have knife edges as in Fig. 8 or be secured in the blocks 20 as in Fig. 9.

The armature comprises an annular coil of wire 25, Fig. 5, mounted on an annular support 25ª of insulating material carried by a rigid spider 25ᵇ supported by the rod 11. The coil is mounted in the air gap 14 and as the machine pedestal vibrates, the coil moves relatively to the field magnet in an axial direction thereby inducing in the coil a low potential electro motive force which at any given instant is proportional to the velocity of vibration of the machine pedestal at said instant. Connected to opposite ends of the coil 25 are circuit wires 25ᶜ leading to the galvanometer 9, which elements, in combination with a cyclically operable current-interrupting device more fully described in the following, comprise means for analyzing the characteristics of the current developed in the coil 25.

Referring now to Figs. 1 to 3, I have shown a current-interrupting device suitable for the purposes of the present invention. In these figures, 26 indicates a suitably supported stationary casing which has a bearing for the stub shaft 26ª driven by the flexible shaft 7. On the shaft is a cam 27 having a raised or cam surface 27ª extending for half of the circumference of the cam although a longer or shorter arc will not interfere seriously with the operation of the device. A cam exactly 180° long, as shown, gives the device maximum sensitivity along with other desirable characteristics and is therefor preferable. A pointer 28 is also mounted on the stub shaft 26ª for rotation with it and the body to be balanced. It is located diametrically opposite the mid-portion of the raised portion of the cam. 29 indicates a ring or annular member mounted on a suitable bearing 30 on the frame 26 and carries a fixed contact 31 and a second contact 32 which is actuated by the cam 27 as it rotates. Since the ring member 29 is mounted to turn it is necessary to provide movable connections between the contacts and the circuit wires. Such connections may be in the form of flexible leads or sliding contacts of ordinary construction. By reason of this construction, the contacts 31 and 32 are in engagement and the circuit controlled thereby is positively closed during one-half of each revolution of the machine being balanced and of the cam. In the rear of the ring or member 29, Fig. 3, and fastened thereto is a spur gear 33 which meshes with an idler gear 34, and the latter engages a pinion 35. The pinion is mounted on a shaft 36 which is turned by the small handle 37, the purpose of this arrangement being to permit of shifting of the contacts angularly about the cam. In other words, the midpoint of the closed circuit period may be made to come at any desired instant during each revolution of the rotor being balanced and of the cam. A pointer 38 is fixed on the ring 29 for movement therewith and with the contacts 31 and 32 and overlies a stationary graduated scale plate 39 carried by the casing 26. By reason of this arrangement, the pointer 38 indicates on the scale 39 the angular position of the rotor being balanced and of the rotating pointer 28 the instant of the midpoint of the closed circuit period.

A correct balance of any rotor having appreciable axial length requires the addition (or removal) of two weights, one near each end of the rotor. There are, therefore, four quantities to be determined during balancing, the amount of each weight and the angular position on the rotor at which it should be applied.

In an article by T. C. Rathbone published in the Transactions of the A. S. M. E. for 1929, vol. 51, pages 267 to 284, there is described a method whereby these quantities may be calculated after making the following measurements or observations on each of the two chosen pedestals of the machine:

(1) Relative amplitude of vibration of the pedestal, the absolute amplitude need not be known. This is indicated by the galvanometer which is calibrated to indicate units of movement of the pedestal.

(2) Angular position of the rotor at the instant the pedestal is in the extreme right hand position in its vibratory motion, which is termed the "phase angle". The manner in which these measurements may be obtained by the use of my novel apparatus will now be explained.

Curve D, Fig. 12 represents the horizontal, linear displacement of any pedestal due to vibration, plotted against the angular displacement of the machine rotor. Due to unbalance in the rotor, this displacement of the pedestal is in the form of a sine curve. It is desired to locate accurately the position of the rotor at the instant represented by the peak 40 of curve D. Curve V represents the velocity of the pedestal due to vibration and is the first derivative or rate of change of curve D. The instantaneous E. M. F. induced by the moving coil 25, Fig. 5, of either generator is proportional to this velocity. The galvanometer 9, Fig. 1, thus receives a series of impulses, each of a duration equivalent to 180° of rotation of the rotor, and one impulse per revolution thereby causing a deflection of its indicating needle. This is due to the fact that the cam 27ᵃ maintains the contacts 31—32 closed for this portion of each revolution. These impulses are represented by the shaded areas 41 and 42 in Fig. 12. Whether these impulses are due to generator 4 or 5 will depend upon whether the switch 8, Fig. 1, completes the circuit of one or the other of them. If the contacts 31—32 are now shifted angularly about the cam 27 by rotating the handle 37 clockwise, Figs. 2 and 3, until the needle of the galvanometer registers zero, the impulses will be as shown in Fig. 13 where that part of the impulse of the V or E. M. F. curve below the horizontal line is equal to that part above the line. This locates accurately the point 40 as indicated by the pointer 38, Fig. 2, on the stationary circular scale 39. Moving the contacts 31 and 32 to effect a zero reading of the galvanometer also moved the pointer 38 over the scale 39 and its position on said scale indicates the "phase angle".

Now if the contacts 31—32 are further shifted through 90° from the position last mentioned, the electric impulses received by the galvanometer from a generator will be as represented by the shaded areas 43—44 in Fig. 14, and the corresponding galvanometer reading will be proportional to the amplitude of vibration. The galvanometer reading therefore determines in suitable units the relative amplitude of vibration of the pedestal being examined. The position of the switch 8 will be determined by which of the two pedestals is under consideration.

Although this method of analyzing unbalance vibrations may be easily used, a complete understanding of it requires familiarity with vectors and their properties. Any simple sinusoidal vibration such as exists at the pedestals of a rotating machine may be specified by means of a single vector which is called the generating vector for that particular vibration. The readings of "phase angle" and "relative amplitude" made on any one pedestal of a machine at any instant, completely specify the generating vector which describes and is characteristic of the vibratory motion of the pedestal at that instant. This is illustrated in Fig. 10 where, for instance, if any one pedestal gave a phase angle indication of 45 degrees and an amplitude of three units as indicated by the galvanometer, the generating vector describing that vibration would be shown as the vector 0—1 drawn at an angle of 45° and three units long. This vector is then a simple specification of the sinusoidal motion represented by the sine curve 1—1—1, Fig. 11. Similarly, another pedestal or point on the machine, or even the same pedestal, after applying a balance weight, might indicate a phase angle (read by pointer 38 on dial 39, Fig. 2) of 135°, Fig. 10, and an amplitude of two units. This motion would be specified by vector 0—2 which describes the sine curve 2—2—2 of Fig. 11. If the vectors 0—1 and 0—2 are thought of as rotating, at rotor speed about point 0, the actual displacement of the vibrations they represent would be equal to the projections of the vectors on the vertical line 3—0—3. In dealing with these vector quantities, each one has two dimensions,—an angle (phase angle) and a magnitude or amplitude.

As before indicated the purpose of the apparatus here described is to determine the relative amplitudes of vibrations and what will be called the "phase angles" of these vibrations of a plurality of points on the machine being tested and under various conditions of unbalance.

The position of the rotor, during its rotation, at the instant any chosen point on the machine is in some previously defined momentary state during its vibration will be called the "phase angle" of the vibration of said point under the existing conditions.

The chosen points are the points of attachment of the generators which may be set up to operate horizontally, vertically or in any desired position.

The previously defined momentary state during the vibration of a chosen point might be for example (a) When the moving coil 25, Fig. 5, is in its innermost position relative to the field, or (b) In its outermost position, or (c) In its mid position, moving outward, or (d) In its mid position, moving inward.

When using the apparatus here described, the most accurate readings may be made if this momentary reference state in the vibration is taken as one of the extreme or end positions of the moving coil 25. For the sake of simplifying the description, I will arbitrarily define the momentary reference state to be when the moving coil 25 is in its extreme outermost position in its motion relative to the field structure 13. For the arrangement of apparatus shown in Fig. 1, this will be when the pedestals are in the extreme right hand position during their vibration. When the center of the contact period occurs at this instant, the galvanometer 9 will indicate zero, and it will be assumed that the electrical connections are so made as to polarity that, starting with this setting of the contactor, rotation of the gear wheel 35 by handle 37, Fig. 2, in a right hand direction will cause the meter reading to increase (toward the right) from zero. Then it will be known that if the meter reads zero and right hand rotation of the gear wheel 35 decreases the meter reading, the moving coil is at its innermost position, and the correct reading must be obtained by rotating the ring 29 and contacts 31, 32, 180 degrees, by means of the gear wheel 35 and handle 37. When this is done, the meter reading will again be zero, and right hand rotation of handle 37 will increase said reading. The operator will then know that the midpoint of the contact period is occurring at the instant the moving coil is in its extreme outward position, which I have arbitrarily assumed to be the momentary reference state during the vibration of the point in question.

The "phase angle" of the vibration of the point in question may be measured from any arbitrarily chosen zero, and will then be given by the reading of pointer 38 on scale 39.

The pointer 38 with contacts 31 and 32 is then shifted 90° by turning handle 37 to the right. The meter 9 will then indicate a maximum reading, which reading is taken as the relative amplitude of vibration of the point in question.

The apparatus thus makes it possible to determine, for any chosen point on the machine and under any condition of vibration, the two quantities (a) Phase angle, and (b) relative amplitude, which define the characteristics of the vibration of said point.

What I claim as new and desire to secure by Letters Patent of the United States is:

1. In apparatus for determining the unbalance of a rotating body, a source of low potential current having characteristics determined by said unbalance, means dependent on the cyclical interruption and restoration of said current at accurately determinable intervals for analyzing the characteristics of the current and a current-interrupting device in series with said source and said means comprising a rotatable support, a movable and a stationary contact mounted on said support, means for rotating said support, a scale means, one part of which is movable with said support to indicate the angular position of said contacts, and a cam rotated in synchronism with said body, said cam being effective to produce positive closure of said contacts during a portion of the rotation of the cam determined by the position of the contacts.

2. In apparatus for determining the unbalance of a rotating body, a source of low potential current having characteristics determined by the said unbalance, means dependent on the cyclical interruption and restoration of said current at accurately determinable intervals for analyzing the characteristics of the current and a current-interrupting device in circuit with said source and said means comprising a cam rotated in synchronism with the body, a rotatable support having substantially the same axis of rotation as the cam, a movable and a stationary contact mounted on said support, means for turning said support about its axis, a pointer attached to the support and a stationary graduated dial cooperating with said pointer to indicate the angular position of said contacts, said cam being positioned to produce positive closure of said contacts during a portion of the rotation of the cam determined by the position of the contacts.

3. In apparatus for determining the unbalance of a rotating body, an intermittently operable circuit-interrupting device comprising a cam adapted to be rotated in synchronism with the body, a pair of contacts, one of which is actuated by the cam to effect positive contact with the other during a predetermined portion of each revolution of the cam, means for moving the contacts angularly with respect to the cam thereby to determine the period of closure of said contacts, and a scale means, one part of which is movable with said contacts to indicate the angular position thereof.

4. In apparatus for determining the unbalance of a rotating body, an intermittently operable circuit-interrupting device comprising a cam adapted to be rotated in synchronism with the body, a rotatable support having substantially the same axis of rotation as said cam, a pair of contacts mounted on said support, one of said contacts being actuated by the cam to effect positive contact with the other during a predetermined angular rotation of the cam, means for turning the support on its axis to change the relative positions of the cam and the contact actuated thereby, a stationary scale, and a pointer mounted on the support for rotation therewith to indicate on the scale the angular position of the contacts.

ERNEST L. THEARLE.